March 5, 1957 G. H. HOUSEL, SR 2,783,575
COMBINATION FISHING ROD HOLDER AND
AUTOMATIC FISH HOOKING DEVICE
Filed Sept. 27, 1955 2 Sheets-Sheet 1
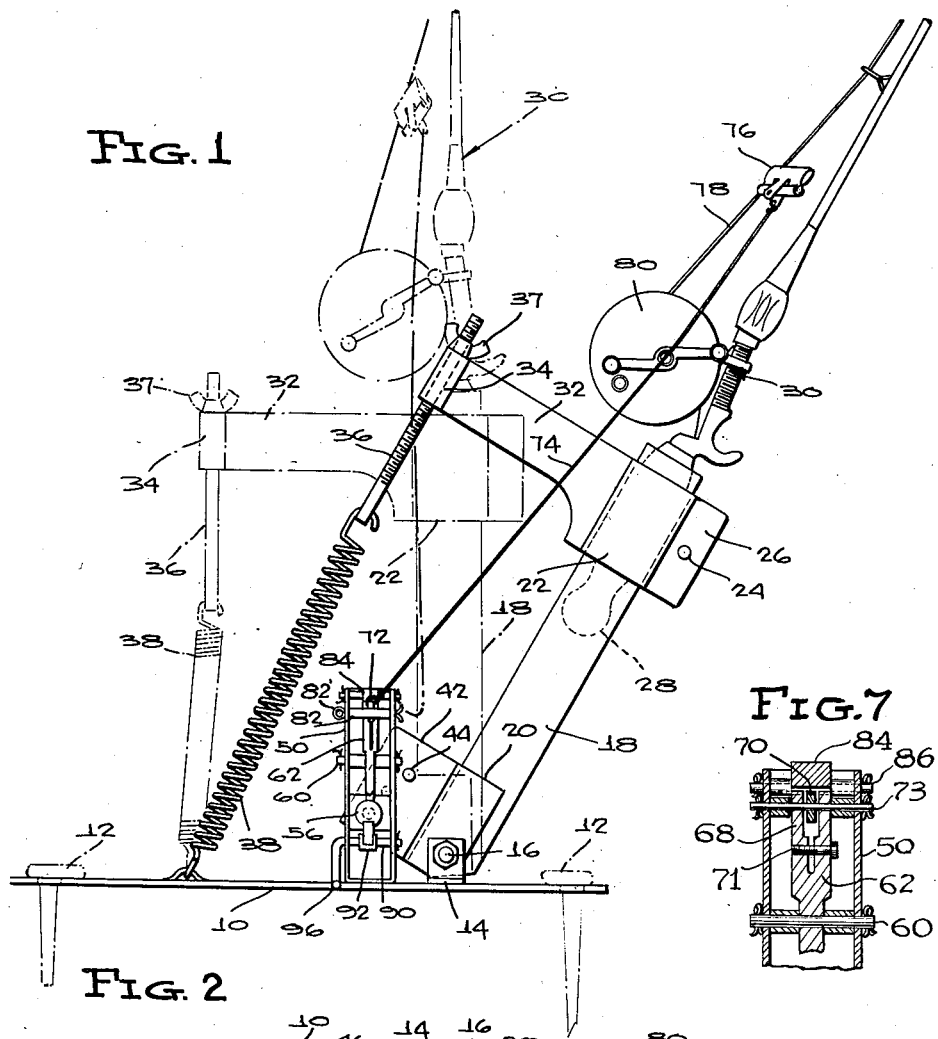
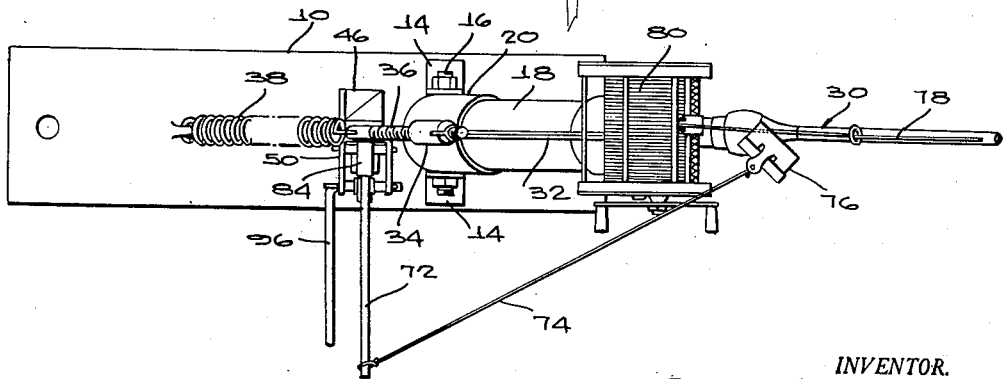
INVENTOR.
GEORGE H. HOUSEL, Sr.
BY
McMorrow, Berman + Davidson
ATTORNEYS

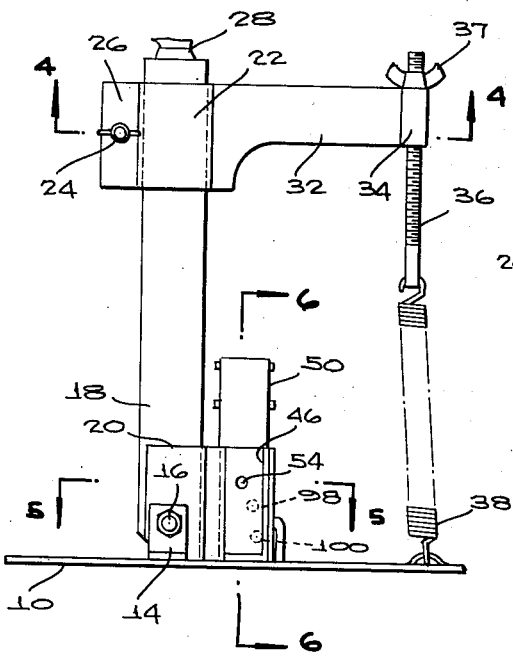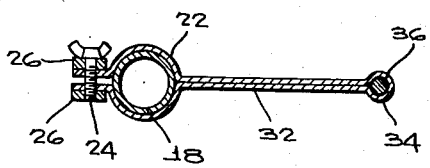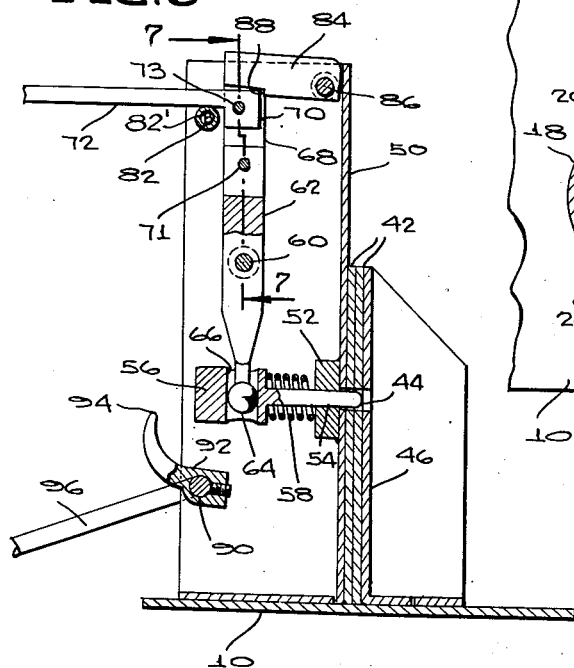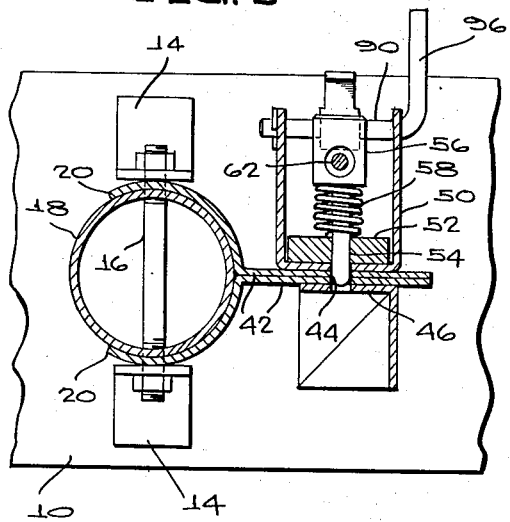

United States Patent Office 2,783,575
Patented Mar. 5, 1957

2,783,575

COMBINATION FISHING ROD HOLDER AND AUTOMATIC FISH HOOKING DEVICE

George H. Housel, Sr., Culver City, Calif.

Application September 27, 1955, Serial No. 536,817

5 Claims. (Cl. 43—16)

This invention relates to a device adapted to hold a fishing rod and, responsive to taking of the bait by a fish, to hook the fish and set the hook in the fish's mouth.

The main object of the present invention is to provide a generally improved device of this type, having an improved, novelly designed, triggering mechanism which is adapted to remain in a set position until such time as the fish takes the bait and exerts a pull on the line, but which is adapted then to operate immediately to release and permit operation of the means for effecting an instantaneous snapping of the rod to a hook setting position. One important object of the invention, in connection with the above, is to so design the triggering mechanisms that the possibility of its being accidentally released will be reduced to a minimum, while still imparting full sensitivity to said mechanism to insure that when it should be released, it will move immediately to a disengaged position.

Another object of importance is to provide a device as stated so designed as to permit the fishing rod to be securely held therein in proper position for snapping of the rod to its fish hooking position, with the rod being nevertheless supported in such a manner as to permit the rod to be swiftly removed from and completely disengaged from the device, so that the fish can be played by the angler and reeled in.

Another object of importance is to provide a device of the nature referred to which will be characterized by its ruggedness, its ready adaptability for association with fishing rods of different sizes and types, and by its further adaptability for making adjustments over a wide range of the means for snapping the rod to an upright, fish hooking position.

Still another object is to incorporate in the device a means for facilitating setting of the triggering mechanism, with a minimum difficulty and loss of time.

Other objects will appear from the following description, the claims appended thereto, and from the annexed drawing, in which like reference characters designate like parts throughout the several views, and wherein:

Figure 1 is a side elevational view of the device, the device being shown in full lines in its set position and in dotted lines in its released position;

Figure 2 is a top plan view of the device and the butt portion of the fishing rod;

Figure 3 is a side elevational view of the device, in its released position, showing the side opposite that seen in Figure 1;

Figure 4 is a transverse sectional view on line 4—4 of Figure 3;

Figure 5 is an enlarged, fragmentary, plan sectional view on line 5—5 of Figure 3; and Figure 6 is an enlarged transverse sectional view, on line 6—6 of Figure 3.

Figure 7 is a sectional view taken on the line 7—7 of Figure 6.

A flat base plate 10 of rectangular outer configuration is provided with openings at its opposite ends adapted to receive anchoring elements 12, such as stakes adapted to be driven into the ground or bolts capable of being threaded into the surface of a wharf or dock, or into the seat of a boat.

Fixedly secured to the base plate 10, adjacent the forward end thereof, are transversely spaced, identically but oppositely formed, L-shaped pivot brackets 14, 14, having transversely aligned openings receiving a transversely extending, horizontal pivot bolt 16 passing through the lower end of a fishing rod support tube 18. Extending about part of the circumference of the fishing rod support tube are arcuate plate members 20 (Figure 5), the purpose of which will be made presently apparent, said plate members being fixedly secured to the surface of the support tube 18.

Extending about the upper end of the support tube or sleeve 18 (see Figures 3 and 4) is a split ring clamp 22, having spaced ears formed with transversely aligned openings receiving a tightening bolt 24 (see Figure 4), said tightening bolt passing through openings formed in rectangular blocks 26 disposed in face to face contact with the outer surfaces of the clamp ears, one of said blocks having a threaded opening, so as, responsive to rotation of the bolt, to draw the ears together to thereby securely engage the clamp 22 about the upper end of the tube 18.

The upper end of the support sleeve 18 is formed open, to receive the butt 28 of a fishing rod generally designated at 30. The fishing rod is removably supported in the tube 18, so that it can be swiftly lifted out of the tube whenever a fish has been hooked, and is to be played and reeled in by the angler.

The clamp 22 is integrally formed with a laterally projecting, elongated arm 32 composed of folded portions of the clamp member, said folded portions merging at the outer ends of the arm 32 into a small diameter sleeve 34 the axis of which parallels the axis of tube 18. Slidable within the sleeve 34 is a threaded stud 36, on the outer end of which is threaded a wing nut 37. On turning the wing nut 37 home against the adjacent end of the sleeve 34, the stud 36 is shifted axially within the sleeve, so as to adjust the tension of a contractile spring 38 connected between the inner end of the stud and the base plate.

The arcuate plate members 20, as shown in Figure 5, are integrally formed with flat, rectangular plates, constituting the triggering arm 42 that projects laterally from the lower ends of the tube 18. Formed in the plate member 42 are registering openings 44 constituting an aperture in said triggering arm, and the openings 44 register with an opening formed in an upstanding guide plate 46 of angular cross section.

Spaced transversely of the base plate 10 from the plate 46 a distance sufficient for passage of the triggering arm therebetween is an upstanding, channel shaped trigger support plate 50, to the inner surface of which is welded or otherwise fixedly secured a block 52 having an aperture registering with the apertures of the triggering arm and of the plate 46.

Horizontally slidable in the registering openings of the triggering arm 42, 42 and trigger support plate 50 is a detent 54, integral at its outer end with a cylindrical block 56, a compression spring 58 being held under compression between the block 56 and the block 52.

Extending transversely between the side walls of the trigger support plate 50 is a pivot pin 60 for a trigger 62 having a tapered lower end portion merging into a ball element 64 universally movable within a vertical, through opening 66 provided in block 56. Trigger 62 is disposed substantially vertically in the space between the side walls of plate 50, and at its upper end is bifurcated as at 68 to receive a rectangular enlargement 70 formed upon the inner end of an elongated trigger release arm 72. The arm 72 is pivotally connected to the trigger 62 by means of a pivot pin 73. A tensioning screw 71 is threadedly engaged with one of the fork arms of trigger 62, and extends through the other fork of said arm, to adjust said forks toward and away from one another and thereby adjust the extent to which the forks are in frictional engagement with enlargement 72. This in turn has the effect of adjusting the amount of pull required on trigger release arm 72 before it will swing sufficiently to trip the mechanism. The pivot axis of arm 72 parallels the pivot axis of the trigger 62, said axes being normal to the axis of swinging movement of the tube 18 and to the path of slidable movement of the detent 54.

Connected to the outer end of the arm 72 (see Figures 1 and 2) is a flexible connector 74 such as a short length of fishing line, said connector being attached to a spring clip 76 which can be releasably clipped to the fishing line 78 of rod 30, which line 78 is coiled about the usual reel 80.

Limiting the downward swinging movement of the arm 72 is a stop 82 in the form of a sleeve extending transversely between the side walls of plate 50, and held in place by a cotter pin 82' as shown in Figure 1.

Disposed above the arm 72, in the space between the side walls of plate 50, is a vertically swingable dog 84 pivotally mounted at 86 upon the plate 50, to swing about an axis paralleling those of arm 72 and trigger 62. The dog 84, at its free end, has a shallow, downwardly opening, angular recess 88 adapted to engage the upper end of the trigger 62 in the set position of the triggering mechanism.

Below block 56, there is mounted a transversely extending pin 90, and this passes through an opening provided in a small block 92, the block 92 being fixedly secured to the pin 90 by means of a set screw, in selected positions of rotatable adjustment of said block about the pin 90. The block is integral with an upwardly curving finger 94, and the pin 90, at one end thereof, is integrally provided with an elongated, radially extending handle 96 projecting laterally, outwardly from the plate 50.

In use of the device, the tube 18, with the butt of the fishing rod supported therein, is swung to a selected inclination from the vertical, as for example, the full line position of Figure 1. In this connection, in addition to opening 44 of the plate 42, 42, other openings are formed in said plates, as shown in Figure 3, said other openings being designated at 98, 100 respectively. When the tube 18 has ben swung to a selected angle, one of the openings 44, 98, 100 will be in registration with the detent 54. In other words, when the tube 18 is at an inclination of perhaps 15 degrees from the vertical, the opening 44, that is, the uppermost opening of the tube supported triggering arm defined by plate 42, 42 will be in registration with the detent. If it is desired that the tube 18 be at a more pronounced angle from the vertical 1, as for example 30 degrees, the opening 98 would be in registration with the detent. Then, when the opening 100 is in registration with the detent, the tube 18 would be at an angle of approximately 45 degrees from the vertical. This permits the rod to be supported at any of a plurality of adjusted inclinations from the vertical when the device is in its set position.

In any event, when the tube 18 has been swung to the selected angle of inclination, to register one of the openings 44, 98, 100 with the detent, the handle 96 is pulled upwardly, swinging the finger 94 clockwise when viewing the same as in Figure 6. This causes the free end of the finger 94 to engage the outer end of block 56, shifting said block to the right in Figure 6 against the restraint of spring 58, thus placing spring 58 under substantial compression. Movement of block 56 to the right in Figure 6 shifts the detent 54 into the selected opening 44, 98, or 100 as the case may be, thus locking the plates 42, and hence the tube 18, in the inclined, set position.

When the tube 18 is in this position, the spring 38 will be placed under heavy tension, and with finger 94 still held against block 56 to prevent retrograde movement of detent 54 from its locking position dog 84 is swung downwardly, to engage the upper end of the trigger 62. The handle 96 may now be released, and the dog 84 will prevent the trigger 68 from swinging in a clockwise direction about its pivot axis 60 under the force of spring 58.

The device is now ready for use, and the fishing rod butt can now be inserted in the tube 18, after a cast has been made, and clip 76 engaged with line 78.

When a fish takes the bait, and exerts a pull on the line 78, said pull wil be transmitted through the connector 74 to the elongated, laterally projecting arm 72. This exerts an upward pull on the arm 72, and the enlargement 70 thereof will be caused, at the upper surface of the enlargement, to bear against the underside of the dog 84. A cam action is exerted against the dog 84, tending to bias the same upwardly at its free end, and this shifts the dog 84 out of engagement with the upper end of the trigger 62.

Spring 58 is now free to expand, and shifts detent 54 to the left in Figure 6, out of the selected aperture of the arm composed of plates 42, 42. As a result, spring 38 is now free to contract, and will instantaneously exert a downward force on the arm 32, tending to snap the fishing rod to an upright position shown in dotted lines in Figure 1. Movement of the fishing rod beyond this position is prevented, by engagement of the lower ends of the plates 42, 42 against the base plate.

It will be readily appreciated that the degree of force exerted on the fishing rod, tending to snap the same to its fish hooking and hook setting positions shown in dotted lines in Figure 1, can be adjusted by means of the wing nut 37.

As soon as the hook has been set in the fish's mouth by automatic operation of the triggering mechanism, the rod is grasped by the angler, and the clip 76 pulled off the line 78. The rod, removed from the tube 18, is now under the control of the angler, for the purpose of playing and reeling in the fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A combination fish hooking device and support for a fishing rod having a line, comprising: a base plate; a fishing rod receiving sleeve pivoted upon the base plate for swinging movement about an axis extending transversely of the base plate; resilient yielding means arranged to bias the sleeve in a direction effective to swing the rod to a fish hooking position; a trigger arm projecting laterally from said sleeve and having at least one opening formed therein; an upstanding trigger support fixedly mounted upon the base plate adjacent said trigger arm; detent means slidably mounted in said trigger support plate for movement transversely of the base plate into and out of said opening, said detent means being adapted when engaged in said opening to releasably hold the sleeve against movement in said direction, the detent means being under spring bias effective to normally shift the detent means out of the opening, thus to free the sleeve for movement in said direction; a pivotally mounted trigger carried by the trigger support plate having a connection at one end to the detent means, thus to, on movement of the trigger in one direction about its pivot axis, shift the detent means into said opening; a dog carried by the trigger support plate adapted to engage the trigger to hold the same against movement in an opposite direction about said pivot axis, thus to releasably engage the detent means in said opening; and means connected with the trigger and having a connection to the fishing line, adapted, responsive to a pull on the fishing line, to shift the dog out of a trigger engaging position, thus to permit movement of the detent means under spring loading thereof out of said opening to free the sleeve for movement to a fish hooking position of the rod, responsive to force exerted on the sleeve by the resilient, yielding means.

2. A combination fish hooking device and support for a fishing rod having a line, comprising: a base plate; a fishing rod receiving sleeve supported upon the base plate for swinging movement about an axis extending transversely of the base plate; an arm projecting laterally from the sleeve at a location spaced longitudinally from the pivot axis of the sleeve; a contractile spring connected between said arm and base plate, said spring being adapted to exert a yielding pull on the arm tending to swing the same in a direction to shift the supported rod to a fish hooking position; a triggering arm projecting laterally from the sleeve adjacent the pivot axis of the sleeve and having at least one opening formed therein; an upstanding trigger support plate fixedly mounted upon the base plate adjacent the trigger arm; a detent mounted upon the trigger support plate for sliding movement in a direction transversely of the base plate into and out of said opening of the trigger arm; means associated with the detent arranged to normally bias the detent in a direction out of said opening; a trigger fulcrumed intermediate its ends upon the trigger support plate and having one end engaged with the detent, said trigger when swung in one direction being adapted to shift the detent into said opening; a dog pivotally mounted upon the trigger support plate and adapted to be swung to a position engaging the trigger to hold the same against movement in an opposite direction, thus to hold the trigger in a set position with the detent engaged in said opening of the trigger arm; a trigger release arm pivotally connected to the trigger adjacent said dog and adapted to be swung in one direction relative to the trigger to shift the dog out of engagement with the trigger, thus to release the detent for movement under the spring bias thereof out of the opening, thereby to release the sleeve for swinging movement in a direction effective to shift the rod to a fish hooking position; and a flexible connection between the trigger release arm and said fishing line, adapted to transmit to the trigger release arm a pull exerted on the fishing line by a fish taking the bait, thus to disengage the dog and release the trigger.

3. A combination fish hooking device and support for a fishing rod having a line, comprising: a base plate; a fishing rod receiving sleeve supported upon the base plate for swinging movement about an axis extending transversely of the base plate; an arm projecting laterally from the sleeve at a location spaced longitudinally from the pivot axis of the sleeve; a contractile spring connected between said arm and base plate, said spring being adapted to exert a yielding pull on the arm tending to swing the same in a direction to shift the supported rod to a fish hooking position; a triggering arm projecting laterally from the sleeve adjacent the pivot axis of the sleeve and having at least one opening formed therein; an upstanding trigger support plate fixedly mounted upon the base plate adjacent the trigger arm; a detent mounted upon the trigger support plate for sliding movement in a direction transversely of the base plate into and out of said opening of the trigger arm; means associated with the detent arranged to normally bias the detent in a direction out of said opening; a trigger fulcrumed intermediate its ends upon the trigger support plate and having one end engaged with the detent, said trigger when swung in one direction being adapted to shift the detent into said opening; a dog pivotally mounted upon the trigger support plate and adapted to be swung to a position engaging the trigger to hold the same against movement in an opposite direction, thus to hold the trigger in a set position with the detent engaged in said opening of the trigger arm; a trigger release arm pivotally connected to the trigger adjacent said dog and adapted to be swung in one direction relative to the trigger to shift the dog out of engagement with the trigger, thus to release the detent for movement under the spring bias thereof out of the opening, thereby to release the sleeve for swinging movement in a direction effective to shift the rod to a fish hooking position; a flexible connection between the trigger release arm and said fishing line, adapted to transmit to the trigger release arm a pull exerted on the fishing line by a fish taking the bait, thus to disengage the dog and release the trigger; and means mounted upon the trigger support plate adapted to be manually shifted into engagement with the detent, for urging the detent into said opening preliminary to engagement of the dog with the trigger.

4. A combination fish hooking device and support for a fishing rod having a line, comprising: a base plate; a fishing rod receiving sleeve supported upon the base plate for swinging movement about an axis extending transversely of the base plate; an arm projecting laterally from the sleeve at a location spaced longitudinally from the pivot axis of the sleeve; a contractile spring connected between said arm and base plate, said spring being adapted to exert a yielding pull on the arm tending to swing the same in a direction to shift the supported rod to a fish hooking position; a triggering arm projecting laterally from the sleeve adjacent the pivot axis of the sleeve and having at least one opening formed therein; an upstanding trigger support plate fixedly mounted upon the base plate adjacent the trigger arm; a detent mounted upon the trigger support plate for sliding movement in a direction transversely of the base plate into and out of said opening of the trigger arm; means associated with the detent arranged to normally bias the detent in a direction out of said opening; a trigger fulcrumed intermediate its ends upon the trigger support plate and having one end engaged with the detent, said trigger when swung in one direction being adapted to shift the detent into said opening; a dog pivotally mounted upon the trigger support plate and adapted to be swung to a position engaging the trigger to hold the same against movement in an opposite direction, thus to hold the trigger in a set position with the detent engaged in said opening of the trigger arm; a trigger release arm pivotally connected to the trigger adjacent said dog and adapted to be swung in one direction relative to the trigger to shift the dog out of engagement with the trigger, thus to release the detent for movement under the spring bias thereof out of the opening, thereby to release the sleeve for swinging movement in a direction effective to shift the rod to a fish hooking position; a flexible connection between the trigger release arm and said fishing line, adapted to transmit to the trigger release arm a pull exerted on the fishing line by a fish taking the bait, thus to disengage the dog and release the trigger; and means mounted upon the trigger support plate adapted to be manually shifted into engagement with the detent, for urging the detent into said opening preliminary to engagement of the dog with the trigger, comprising a finger pivotally mounted upon the trigger support plate and having a free end adapted to bear against one end of the detent on swinging of the trigger in one direction, and a handle having a fixed connection to the finger to effect swinging movement of the finger toward and away from the detent.

5. A combination fish hooking device and support for a fishing rod having a line, comprising: a base plate; a fishing rod receiving sleeve supported upon the base plate for swinging movement about an axis extending transversely of the base plate; an arm projecting laterally from the sleeve at a location spaced longitudinally from the pivot axis of the sleeve; a contractile spring connected between said arm and base plate, said spring being adapted to exert a yielding pull on the arm tending to swing the same in a direction to shift the supported rod to a fish hooking position; a triggering arm projecting laterally from the sleeve adjacent the pivot axis of the sleeve and having at least one opening formed therein; an upstanding trigger support plate fixedly mounted upon the base plate adjacent the trigger arm; a detent mounted upon the trigger support plate for sliding movement in a direction transversely of the base plate into and out of said opening of the trigger arm; means associated with the detent arranged to normally bias the detent in a direction out of said opening; a trigger fulcrumed intermediate its ends upon the trigger support plate and having one end engaged with the detent, said trigger when swung in one direction being adapted to shift the detent into said opening; a dog pivotally mounted upon the trigger support plate and adapted to be swung to a position engaging the trigger to hold the same against movement in an opposite direction, thus to hold the trigger in a set position with the detent engaged in said opening of the trigger arm; a trigger release arm pivotally connected to the trigger adjacent said dog and adapted to be swung in one direction relative to the trigger to shift the dog out of engagement with the trigger, thus to release the detent for movement under the spring bias thereof out of the opening, thereby to release the sleeve for swinging movement in a direction effective to shift the rod to a fish hooking position; and a flexible connection between the trigger release arm and said fishing line, adapted to transmit to the trigger release arm a pull exerted on the fishing line by a fish taking the bait, thus to disengage the dog and release the trigger, said contractile spring including means associated therewith for adjusting the tension of the spring.

References Cited in the file of this patent

UNITED STATES PATENTS

| | | |
|---|---|---|
| 1,856,477 | Gerline | May 3, 1932 |
| 2,295,250 | Zenewich | Sept. 8, 1942 |
| 2,541,876 | Lockwood | Feb. 13, 1951 |
| 2,657,492 | Skorr | Nov. 3, 1953 |
| 2,744,351 | Smith | May 8, 1956 |